(12) United States Patent
Lee (10) Patent No.: US 10,902,316 B2
(45) Date of Patent: Jan. 26, 2021

(54) NEUROMORPHIC DEVICE HAVING INVERTING CIRCUITS

(71) Applicant: SK hynix Inc., Icheon (KR)

(72) Inventor: Hyung-Dong Lee, Hwaseong-si (KR)

(73) Assignee: SK hynix Inc., Icheon-si (KR)

( * ) Notice: Subject to any disclaimer, the term of this patent is extended or adjusted under 35 U.S.C. 154(b) by 674 days.

(21) Appl. No.: 15/846,837

(22) Filed: Dec. 19, 2017

(65) Prior Publication Data

US 2018/0314929 A1 Nov. 1, 2018

(30) Foreign Application Priority Data

Apr. 27, 2017 (KR) ........................ 10-2017-0054590

(51) Int. Cl.
*G06N 3/08* (2006.01)
*G06N 3/063* (2006.01)
*G06N 3/04* (2006.01)

(52) U.S. Cl.
CPC .......... *G06N 3/0635* (2013.01); *G06N 3/0481* (2013.01); *G06N 3/08* (2013.01)

(58) Field of Classification Search
CPC ....... G06N 3/0635; G06N 3/0481; G06N 3/08
USPC ..................................................... 706/33, 34
See application file for complete search history.

(56) References Cited

U.S. PATENT DOCUMENTS

| 7,359,888 | B2 | 4/2008 | Snider | |
|---|---|---|---|---|
| 8,250,010 | B2* | 8/2012 | Modha | G06N 3/049 706/25 |
| 9,106,227 | B2 | 8/2015 | Ranta et al. | |
| 9,805,302 | B2* | 10/2017 | Kim | G11C 11/54 |
| 10,558,910 | B2* | 2/2020 | Lee | G06N 3/0635 |
| 10,586,147 | B2* | 3/2020 | Wu | G06N 3/063 |
| 2006/0057998 | A1 | 3/2006 | Perumana et al. | |
| 2008/0136524 | A1 | 6/2008 | Komori et al. | |
| 2010/0299297 | A1* | 11/2010 | Breitwisch | G11C 13/0004 706/33 |
| 2012/0011089 | A1* | 1/2012 | Aparin | G06N 3/063 706/25 |
| 2012/0011090 | A1* | 1/2012 | Tang | G06N 3/049 706/33 |
| 2012/0011091 | A1* | 1/2012 | Aparin | G06N 3/049 706/33 |
| 2012/0025865 | A1 | 2/2012 | Shimizu | |
| 2012/0084241 | A1* | 4/2012 | Friedman | G06N 3/0635 706/27 |

(Continued)

FOREIGN PATENT DOCUMENTS

| KR | 10-2018-0073070 A | 7/2018 |
|---|---|---|
| KR | 10-2018-0120511 A | 11/2018 |

*Primary Examiner* — Michael T Tran (57) ABSTRACT

A neuromorphic device is provided. The neuromorphic device may include a pre-synaptic neuron, a synapse electrically connected with the pre-synaptic neuron through a row line, and a post-synaptic neuron electrically connected with the synapse through a column line. The post-synaptic neuron may include a post-neuron circuit and a post-neuron transfer function circuit electrically connected to the column line. The post-neuron transfer function circuit may include a first inverting circuit including at least one first pull-up transistor and at least two first pull-down transistors, the pull-down transistors being electrically connected with each other in parallel.

20 Claims, 10 Drawing Sheets

(56) References Cited

U.S. PATENT DOCUMENTS

| | | | |
|---|---|---|---|
| 2014/0344201 A1* | 11/2014 | Arthur | G06N 20/00 |
| | | | 706/25 |
| 2014/0365416 A1* | 12/2014 | Kim | G11C 11/412 |
| | | | 706/25 |
| 2016/0004959 A1* | 1/2016 | Nugent | G06N 3/049 |
| | | | 706/26 |
| 2016/0125287 A1* | 5/2016 | Pantazi | G06N 3/088 |
| | | | 706/26 |
| 2016/0267379 A1* | 9/2016 | Eleftheriou | G06N 3/049 |
| 2016/0350647 A1* | 12/2016 | Hosokawa | G06N 3/049 |
| 2016/0371583 A1* | 12/2016 | Hosokawa | G06N 3/063 |
| 2017/0193354 A1* | 7/2017 | Lee | G06N 3/088 |
| 2017/0243108 A1* | 8/2017 | Ritter | G06N 3/049 |
| 2017/0364793 A1* | 12/2017 | Kim | G11C 11/54 |
| 2017/0364801 A1* | 12/2017 | Kim | G06N 3/049 |
| 2018/0181856 A1 | 6/2018 | Lee | |
| 2018/0189648 A1* | 7/2018 | Sengupta | G06N 3/08 |
| 2018/0314929 A1 | 11/2018 | Lee | |
| 2019/0173474 A1* | 6/2019 | Knowles | H03K 3/011 |

\* cited by examiner

FIG. 8 ively connected to an output node of
the first inverting circuit, a gate electrode electrically con-
nected to an input node of the first inverting circuit, and a
body electrically connected to the drain electrode.

Each of the first pull-down transistors may include an
NMOS transistor. The first pull-down transistors may
include a source electrode electrically connected with a
ground voltage node, a drain electrode electrically con-
nected with an output node of the first inverting circuit, a
gate electrode electrically connected with an input node of
the first inverting circuit, and a body electrically connected
with the drain electrode.

The post-neuron transfer function circuit may further
include a second inverting circuit having an input node
electrically connected with an output node of the first
inverting circuit.

The second inverting circuit may include at least one
second pull-up transistor and at least two second pull-down
transistors. The pull-down transistors may be electrically
connected in parallel with each other.

The first inverting circuit may include at least two first
pull-up transistors including PMOS transistors. At least two
of the first pull-up transistors may have different threshold
voltages.

The first inverting circuit may include at least two first
pull-up transistors including PMOS transistors. At least two
of the first pull-up transistors may have different channel
sizes.

The first pull-down transistors may include NMOS tran-
sistors. At least two of the first pull-down transistors may
have different threshold voltages.

The first pull-down transistors may include NMOS tran-
sistors. At least two of the first pull-down transistors may
have different channel sizes.

In an embodiment of the present disclosure, a neuromor-
phic device may include a pre-synaptic neuron, a synapse
electrically connected with the pre-synaptic neuron through
a row line, and a post-synaptic neuron electrically connected
with the synapse through a column line. The post-synaptic
neuron may include a post-neuron transfer function circuit.
The post-neuron transfer function circuit may include a first
inverting circuit and a second inverting circuit electrically
connected in series with each other. The first inverting
circuit may include a plurality of first pull-up transistors and
a plurality of first pull-down transistors. The second invert-
ing circuit may include a plurality of second pull-up tran-
sistors and a plurality of second pull-down transistors. Each
of the plurality of first pull-up transistors may include a drain
electrode and a body electrically connected with each other.
Each of the plurality of second pull-up transistors may
include a drain electrode and a body electrically connected
with each other. Each of the plurality of first pull-down
transistors may include a drain electrode and a body elec-
trically connected with each other. Each of the plurality of
second pull-down transistors may include a drain electrode
and a body electrically connected with each other.

A number of the first pull-down transistors may be greater
than a number of the first pull-up transistors. A number of the
second pull-down transistors may be greater than a number
of the second pull-up transistors.

The plurality of first pull-up transistors and the plurality
of second pull-up transistors may include PMOS transistors.
At least two of the first pull-up transistors and the second
pull-up transistors may have different threshold voltages.

The plurality of first pull-down transistors and the plu-
rality of second pull-down transistors may include NMOS

NEUROMORPHIC DEVICE HAVING INVERTING CIRCUITS

CROSS-REFERENCE TO RELATED APPLICATIONS

The present application claims priority under 35 U.S.C. § 119(a) to Korean Patent Application No. 10-2017-0054590, filed on Apr. 27, 2017, which is incorporated herein by reference in its entirety.

BACKGROUND

1. Field

The present disclosure relates to neuromorphic devices having synapse arrays including pre-synaptic neurons hav-
ing transfer function circuits, post-synaptic neurons having
transfer function circuits, and synapse arrays having transfer
function circuits.

2. Description of the Related Art

Recently, much attention has been paid to devices in the
field of neuromorphic technology, which use chips that
mimic the human brain. A neuromorphic device based on the
neuromorphic technology may include a plurality of pre-
synaptic neurons, a plurality of post-synaptic neurons, and a
plurality of synapses. The neuromorphic device outputs
pulses or spikes having various levels, amplitudes, and/or
times, according to a learning state of the neuromorphic
device.

SUMMARY

Embodiments of the present disclosure provide a neuro-
morphic device including a synapse array with a post-
synaptic neuron having an output signal curve that changes
smoothly, such as a sigmoid curve.

Other embodiments of the present disclosure provide
pre-synaptic neurons having a transfer function circuit,
post-synaptic neurons having a transfer function circuit, and
inter-synapse circuits having a transfer function circuit.

Other embodiments of the present disclosure provide
transfer function circuits having various circuit configura-
tions.

Other embodiments of the present disclosure are not
limited to the aforementioned embodiments, and those
skilled in the art may clearly understand the other embodi-
ments based on the following descriptions and disclosure.

In an embodiment of the present disclosure, a neuromor-
phic device may include a pre-synaptic neuron, a synapse
electrically connected with the pre-synaptic neuron through
a row line, and a post-synaptic neuron electrically connected
with the synapse through a column line. The post-synaptic
neuron may include a post-neuron circuit and a post-neuron
transfer function circuit electrically connected to the column
line. The post-neuron transfer function circuit may include a
first inverting circuit including at least one first pull-up
transistor and at least two first pull-down transistors, the
pull-down transistors being electrically connected with each
other in parallel.

A number of the first pull-down transistors may be greater
than a number of the first pull-up transistors.

The first pull-up transistor may include a PMOS transis-
tor. The first pull-up transistor may include a source elec-
trode electrically connected to a power supply voltage node, transistors. At least two of the first pull-down transistors and the second pull-down transistors may have different threshold voltages.

The plurality of first pull-up transistors and the plurality of second pull-up transistors may include PMOS transistors. At least two of the first pull-up transistors and the second pull-up transistors may have different channel sizes.

The plurality of first pull-down transistors and the plurality of second pull-down transistors may include NMOS transistors. At least two of the first pull-down transistors and the second pull-down transistors may have different channel sizes.

In an embodiment of the present disclosure, a neuromorphic device may include a pre-synaptic neuron, a synapse electrically connected with the pre-synaptic neuron through a row line, and a post-synaptic neuron electrically connected with the synapse through a column line. The post-synaptic neuron may include a post-neuron transfer function circuit. The post-neuron transfer function circuit may include an inverting circuit. The inverting circuit may include a plurality of pull-up transistors and a plurality of pull-down transistors. The plurality of pull-down transistors each may include at least two channel sizes. The plurality of pull-up transistors each may have drain electrodes and bodies electrically connected with each other. The plurality of pull-down transistors each may have drain electrodes and bodies electrically connected with each other.

The plurality of pull-up transistors may include PMOS transistors. The plurality of pull-up transistors may include at least two channel sizes.

The plurality of pull-up transistors may include PMOS transistors. The plurality of pull-up transistors may include at least two threshold voltages.

The plurality of pull-down transistors may include NMOS transistors. The plurality of pull-down transistors may include at least two threshold voltages.

Details of other embodiments are included in the detailed description and drawings.

DETAILED DESCRIPTION

Various embodiments will be described below in more detail with reference to the accompanying drawings. Embodiments of the present disclosure may, however, have different forms and should not be construed as limited to the embodiments set forth herein. Rather, these embodiments are provided so that this disclosure will be thorough and complete, and will sufficiently convey the scope of the claims to those skilled in the art.

Terms used in this specification are used to describe exemplary embodiments without limiting the present disclosure. The terms of a singular form may include plural forms unless referred to the contrary. The meaning of 'comprise' or 'comprising' used in the specification specifies a component, step, operation, and/or element, but does not exclude other components, steps, operations, and/or elements.

When one element is referred to as being 'connected to', 'connected with' or 'coupled with' another element, the former element may be directly connected or coupled with the latter element, or another element may be interposed therebetween. On the other hand, when one element is referred to as being 'directly connected to', 'directly connected with' or 'directly coupled with' another element, it may indicate that no element is interposed therebetween. In the present disclosure, 'and/or' may include each described item, or one or more combinations of the described items.

Throughout the specification, like reference numerals refer to the same elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

Throughout the specification, 'potentiating,' 'setting,' 'learning,' and 'training' may be used as the same or similar terms, and 'depressing,' 'resetting,' and 'initiating' may be used as the same or similar terms. For example, an operation of lowering the resistances of synapses may be described as potentiating, setting, learning, or training, and an operation of raising the resistances of synapses may be described as depressing, resetting, or initiating. Furthermore, when synapses are potentiated, set, or trained, a gradually increasing voltage/current may be outputted because the conductivities of the synapses are increased. On the other hand, when synapses are depressed, reset, or initiated, a gradually decreasing voltage/current may be outputted because the conductivities of the synapses are decreased. For convenience of description, the terms 'data pattern,' 'electrical signal,' 'pulse,' 'spike,' and 'fire' may have the same, a similar, or a compatible meaning. Furthermore, the terms 'voltage' and 'current' may also be interpreted as having the same or a compatible meaning.

Figure 1:
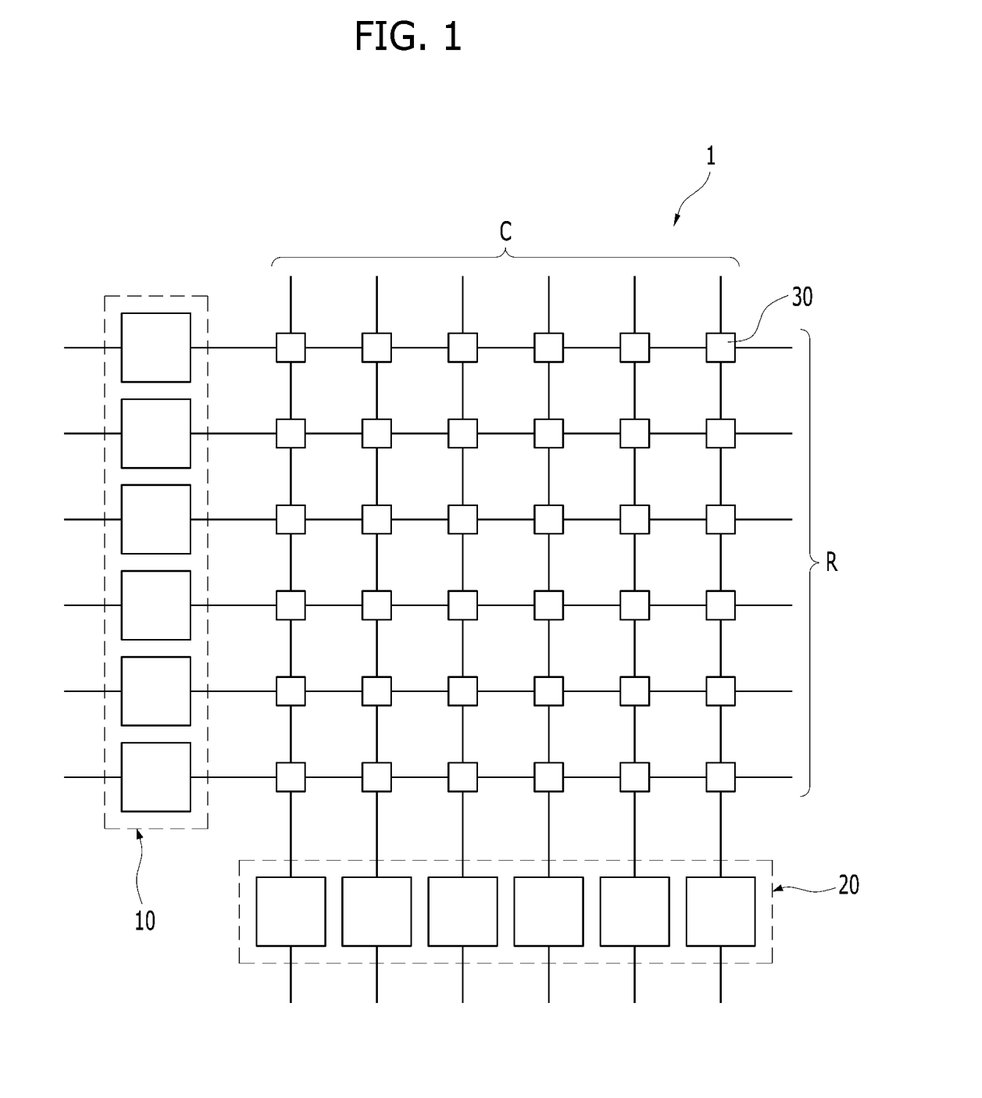
FIG. 1 is a schematic diagram illustrating a synapse array of neuromorphic device in accordance with an embodiment of the present disclosure.

FIG. 1 is a schematic diagram illustrating a synapse array 1 of a neuromorphic device in accordance with an embodiment of the present disclosure.

Referring to FIG. 1, the synapse array 1 of the neuromorphic device may include a plurality of pre-synaptic neurons or circuits 10, a plurality of post-synaptic neurons or circuits 20, and a plurality of synapses 30. The synapses 30 may be disposed in intersection regions between row lines R and column lines C. The row lines R may extend from the pre-synaptic neurons 10 in a row direction and the column lines C may extend from the post-synaptic neurons 20 in a column direction. The pre-synaptic neurons 10 may generate electrical pulses and transmit the electrical pulses to the synapses 30 through the row lines R in a learning mode, a reset mode, or a read-out mode. The post-synaptic neurons 20 may generate electrical pulses and transmit the electrical pulses to the synapses 30 through the column lines C in the learning mode or the reset mode, and may receive electric pulses from the synapses 30 through the column lines C in the read-out mode.

Each of the synapses 30 may include a variable resistive element. For example, resistance states of the synapses 30 may be gradually lowered by set pulses, and gradually elevated by reset pulses. In other examples, a synapse 30 may include a field effect transistor with resistive elements, or a ferroelectric field effect transistor with resistive elements.

Figure 2A:
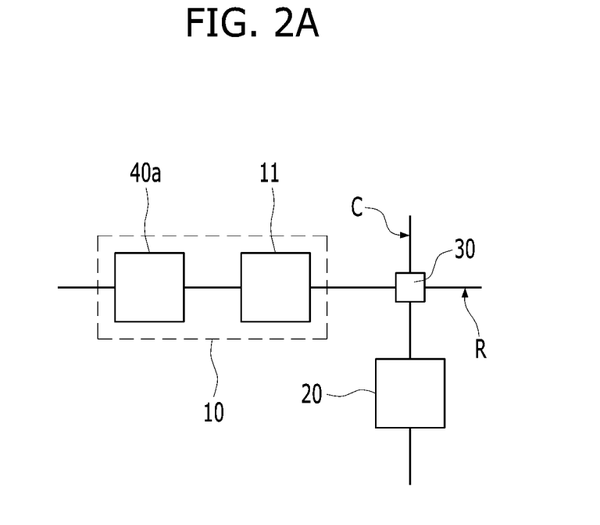
FIGS. 2A to 2C are diagrams schematically illustrating portions of a synapse array of a neuromorphic device in accordance with an embodiment of the present disclosure.
Figure 2B:
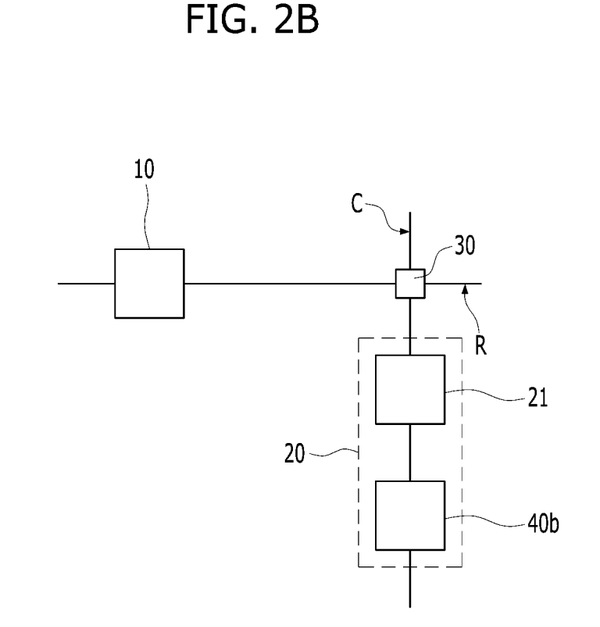
Figure 2C:
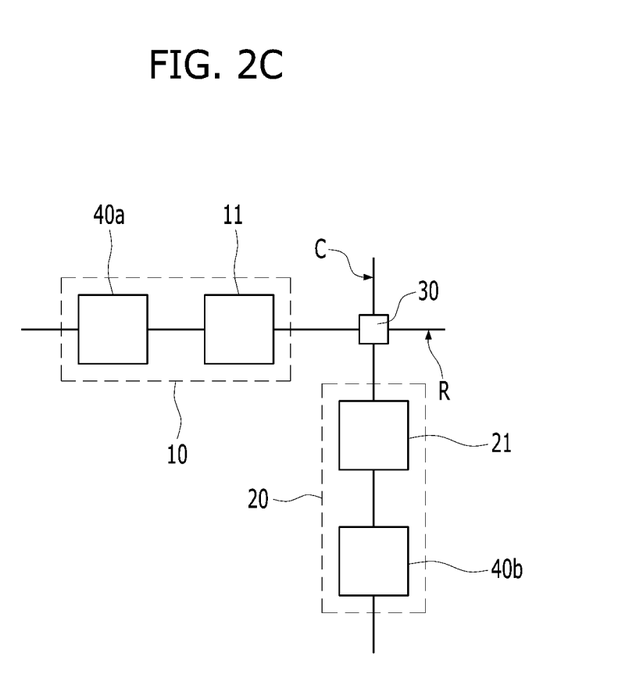

FIGS. 2A to 2C are diagrams schematically illustrating portions of a synapse array of a neuromorphic device in accordance with an embodiment of the present disclosure. Referring to FIGS. 2A to 2C, a synapse array of the neuromorphic device may include a pre-synaptic neuron 10, a synapse 30 electrically connected with the pre-synaptic neuron 10 through a row line R, and a post-synaptic neuron 20 electrically connected with the synapse 30 through a column line C. In an example, a synapse array may include one or more of each of the portions illustrated in FIGS. 2A to 2C. In another example, a synapse array may include some of the portions illustrated in FIGS. 2A to 2C.

Referring to FIG. 2A, a pre-synaptic neuron 10 of a synapse array of a neuromorphic device in accordance with an embodiment of the present disclosure may include a pre-neuron transfer function circuit 40a and a pre-neuron circuit 11 electrically connected with each other in series. An output terminal of the pre-neuron transfer function circuit 40a may be electrically connected with an input terminal of the pre-neuron circuit 11. The pre-neuron transfer function circuit 40a may output an input signal to the pre-neuron circuit 11. An output signal of the pre-neuron circuit 11 may be input to the synapse 30 as a row signal. The output signal curve of the pre-neuron transfer function circuit 40a may have smooth changes, such as in a sigmoid curve. For example, when the output signal of the pre-neuron transfer function circuit 40a has a sigmoid curve shape, the output signal of the pre-neuron transfer function circuit 40a may be interpreted as having multiple levels. Thus, synapse weights of a previous synapse array or input date pattern signals can be interpreted as having multiple levels.

Referring to FIG. 2B, the post-synaptic neuron 20 of the synapse array of the neuromorphic device in accordance with an embodiment of the present disclosure may include a post-neuron circuit 21 and a post-neuron transfer function circuit 40b electrically connected with each other in series. An output terminal of the post-neuron circuit 21 may be electrically connected with an input terminal of the post-neuron transfer function circuit 40b. An output of the synapse 30, i.e., a column signal, may be input to the post-neuron circuit 21. The post-neuron transfer function circuit 40b may convert an output signal of the post-neuron circuit 21 to a sigmoid curve shaped signal.

Referring to FIG. 2C, the pre-synaptic neuron 10 of the synapse array of the neuromorphic device in accordance with an embodiment of the present disclosure may include the pre-neuron transfer function circuit 40a and the pre-neuron circuit 11 electrically connected with each other in series, and the post-synaptic neuron 20 of the synapse array of the neuromorphic device may include the post-neuron circuit 21 and the post-neuron transfer function circuit 40b electrically connected with each other in series.

FIGS. 3A to 3C and 4A to 4C are diagrams schematically illustrating unit transfer function circuits 41a to 41c and complex transfer function circuits 42a to 42c of a synapse array of a neuromorphic device in accordance with an embodiment of the present disclosure. The unit transfer function circuits 41a to 41c and the complex transfer function circuits 42a to 42c may be included in the pre-neuron transfer function circuit 40a and/or the post-neuron transfer function circuit 40b shown in FIGS. 2A to 2C. In an example, a synapse array may include one or more of each of the unit transfer function circuits 41a to 41c and complex transfer function circuits 42a to 42c Illustrated in FIGS. 3A to 4C. In another example, a synapse array may include some of the unit transfer function circuits or complex transfer function circuits illustrated in FIGS. 3A to 4C.

Figure 3A:
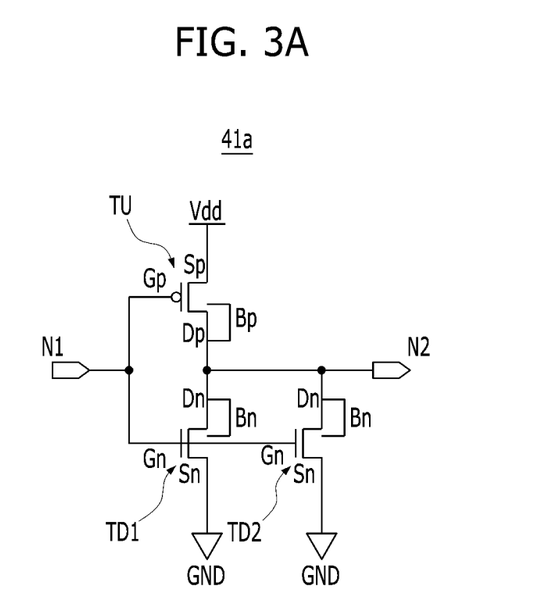
FIGS. 3A to 3C and 4A to 4C are diagrams schematically illustrating unit transfer function circuits and complex transfer function circuits of a synapse array of a neuromorphic device in accordance with an embodiment of the present disclosure.

Referring to FIG. 3A, an unit transfer function circuit 41a of a synapse array of a neuromorphic device in accordance with an embodiment of the present disclosure may include an inverting circuit having at least one pull-up transistor TU and at least two pull-down transistors TD1 and TD2. For example, the number of the pull-down transistors TD1 and TD2 may be greater than the number of the pull-up transistor TU. The pull-up transistor TU and the pull-down transistors TD1 and TD2 may be connected with each other in series. The pull-down transistors TD1 and TD2 may be connected with each other in parallel. A gate electrode Gp of the pull-up transistor TU and gate electrodes Gn of the pull-down transistors TD1 to TD2 may be electrically connected to an input node N1. A source electrode Sp of the pull-up transistor TU may be electrically connected with a power supply voltage node Vdd and source electrodes Sn of the pull-down transistors TD1 and TD2 may be connected with a ground voltage node GND. A drain electrode Dp of the pull-up transistor TU and drain electrodes Dn of the pull-down transistors TD1 and TD2 may be electrically connected with each other and electrically commonly connected with an output node N2. Furthermore, the drain electrode Dp and a body Bp of the pull-up transistor TU may be electrically connected with each other. The drain electrode Dn and body Bn of the pull-down transistor TD1, and the drain electrode Dn and body Bn of the pull-down transistor TD2, may be electrically connected with each other, respectively. Thus, the body Bp of the pull-up transistor TU and the bodies Bn of the pull-down transistors TD1 and TD2 may be also electrically connected with the output node N2. In an example, the pull-up transistor TU is a positive-channel metal oxide semiconductor field effect transistor (PMOS FET), and the pull-down transistors TD1 and TD2 are each a negative-channel metal oxide semiconductor field effect transistor (NMOS FET).

The pull-up transistor TU and the pull-down transistors TD1 and TD2 may have various and independent threshold voltages and channel sizes, respectively. In some embodiments, the pull-up transistor TU and the pull-down transistors TD1 and TD2 may each have different threshold voltages and/or different channel sizes. The channel size may be defined as a size obtained by dividing the channel width by the channel length (W/L).

Figure 3B:
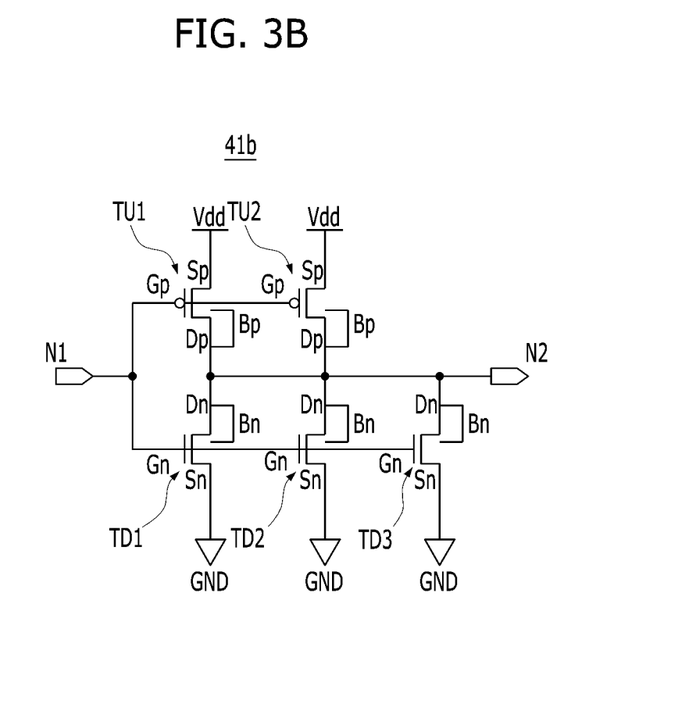

Referring to FIG. 3B, a unit transfer function circuit 41b of a synapse array of a neuromorphic device in accordance with an embodiment of the present disclosure may include an inverting circuit having at least two pull-up transistors TU1 and TU2 electrically connected in parallel, and at least three pull-down transistors TD1 to TD3 electrically connected in parallel. The pull-up transistors TU1 and TU2 may be the same or substantially the same as pull-up transistor TU described above and with reference to FIG. 3A, and the pull-down transistors TD1 to TD3 may be the same or substantially the same as pull-down transistors TD1 and TD2 described above and with reference to FIG. 3A. In an example, the number of the pull-down transistors TD1 to TD3 is greater than the number of the pull-up transistors TU1 and TU2. The drain electrodes Dp of the pull-up transistors TU1 and TU2 and drain electrodes Dn of the pull-down transistors TD1 to TD3 may be electrically connected to the bodies Bp of the pull-up transistors TU1 and TU2 and bodies Bn of the pull-down transistors TD1 to TD3, respectively. The pull-up transistors TU1 and TU2 may be connected with each other in parallel, and the pull-down transistors TD1 to TD3 may be connected with each other in parallel. Accordingly, the gate electrodes Gp of the pull-up transistors TU1 and TU2 and gate electrodes Gn of the pull-down transistors TD1 to TD3 may be electrically commonly connected with an input node N1. The bodies Bp of the pull-up transistors TU1 and TU2 and bodies Bn of the pull-down transistors TD1 to TD3 may be electrically connected with drain electrodes Dp of the pull-up transistors TU1 and TU2 and drain electrodes Dn of the pull-down transistors TD1 to TD3, respectively. The drain electrodes Dp of the pull-up transistors TU1 and TU2 and drain electrodes Dn of the pull-down transistors TD1 to TD3 may be electrically commonly connected with the output node N2. The pull-up transistors TU1 and TU2 and the pull-down transistors TD1 to TD3 may have various and independent, or different, threshold voltages and/or channel sizes, respectively.

Figure 3C:
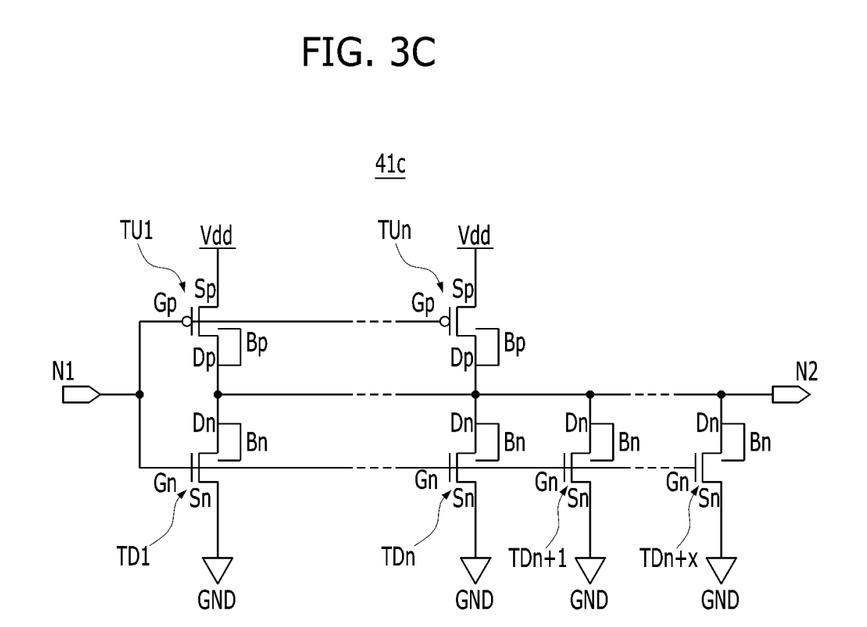

Referring to FIG. 3C, an unit transfer function circuit 41c of a synaptic array of a neuromorphic device in accordance with an embodiment of the present disclosure may include a plurality of pull-up transistors TU1 to TUn connected with each other in parallel and a plurality of pull-down transistors TD1 to TDn, TDn+1, and TDn+x connected with each other in parallel. The pull-up transistors TU1 and TU2 may be the same or substantially the same as pull-up transistor TU described above and with reference to FIG. 3A, and the pull-down transistors TD1 to TD3 may be the same or substantially the same as pull-down transistors TD1 and TD2 described above and with reference to FIG. 3A. In an example, the number of the pull-down transistors TD1 to TDn, TDn+1, and TDn+x is greater than the number of pull-up transistors TU1 to TUn. The unit transfer function circuit 41c may include more pull-down transistors TD1 to TDn, TDn+1, and TDn+x than the pull-up transistors TU1 to TUn. The transistors TU1 to TUn, TD1 to TDn, TDn+1, and TDn+x may have various, different, or independent threshold voltages and/or channel sizes, respectively. In some embodiments, the transistors TU1 to TUn, TD1 to TDn, TDn+1, and TDn+x may each have various, different, or independent threshold voltages and/or different channel sizes, respectively.

Figure 4A:
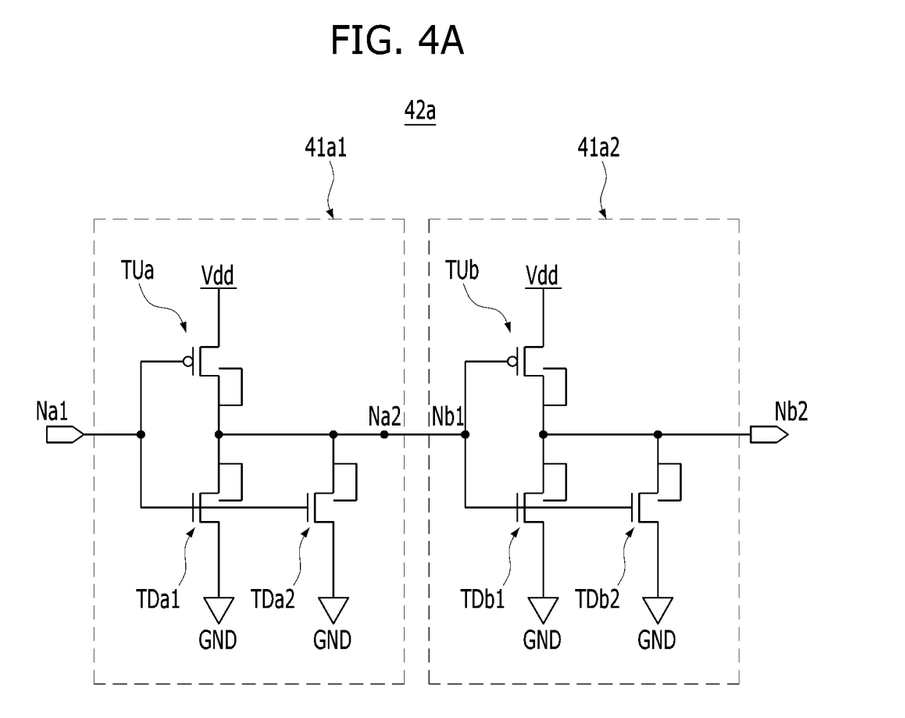

Referring to FIG. 4A, a complex transfer function circuit 42a of a synaptic array of a neuromorphic device in accordance with an embodiment of the present disclosure may include at least two unit transfer function circuits 41a1 and 41a2 electrically connected with each other in series. In other embodiments, a complex transfer function circuit includes more than two unit transfer function circuits. In an example, the unit transfer function circuits 41a1 and 41a2 may each be the same or substantially the same as the unit transfer function circuit 41a described above and with reference to FIG. 3A. Specifically, the first unit transfer function circuit 41a1 may include an inverting circuit having at least one pull-up transistor TUa and at least two pull-down transistors TDa1 and TDa2 connected with each other in parallel, and the second unit transfer function circuit 41a2 may include an inverting circuit having at least one pull-up transistor TUb and at least two pull-down transistors TDb1 and TDb2 connected with each other in parallel.

A first output node Na2 of the first unit transfer function circuit 41a1 and a second input node Nb1 of the second unit transfer function circuit 41a2 may be electrically connected with each other. For example, when the complex transfer function circuit 42a includes two or more even numbers of unit transfer function circuits 41a1 and 41a2, the input signal or a polarity of input voltage input to the first input node Na1 and the output signal or a polarity of the output voltage output to the second output node Nb2 may be the same. When the complex transfer function circuit 42a includes a plurality of unit transfer function circuits 41a1 and 41a2, the output signal at the second output node Nb2 may be a smoother sigmoid curve than when the complex transfer function circuit 42a includes only one unit transfer function circuit.

Figure 4B:
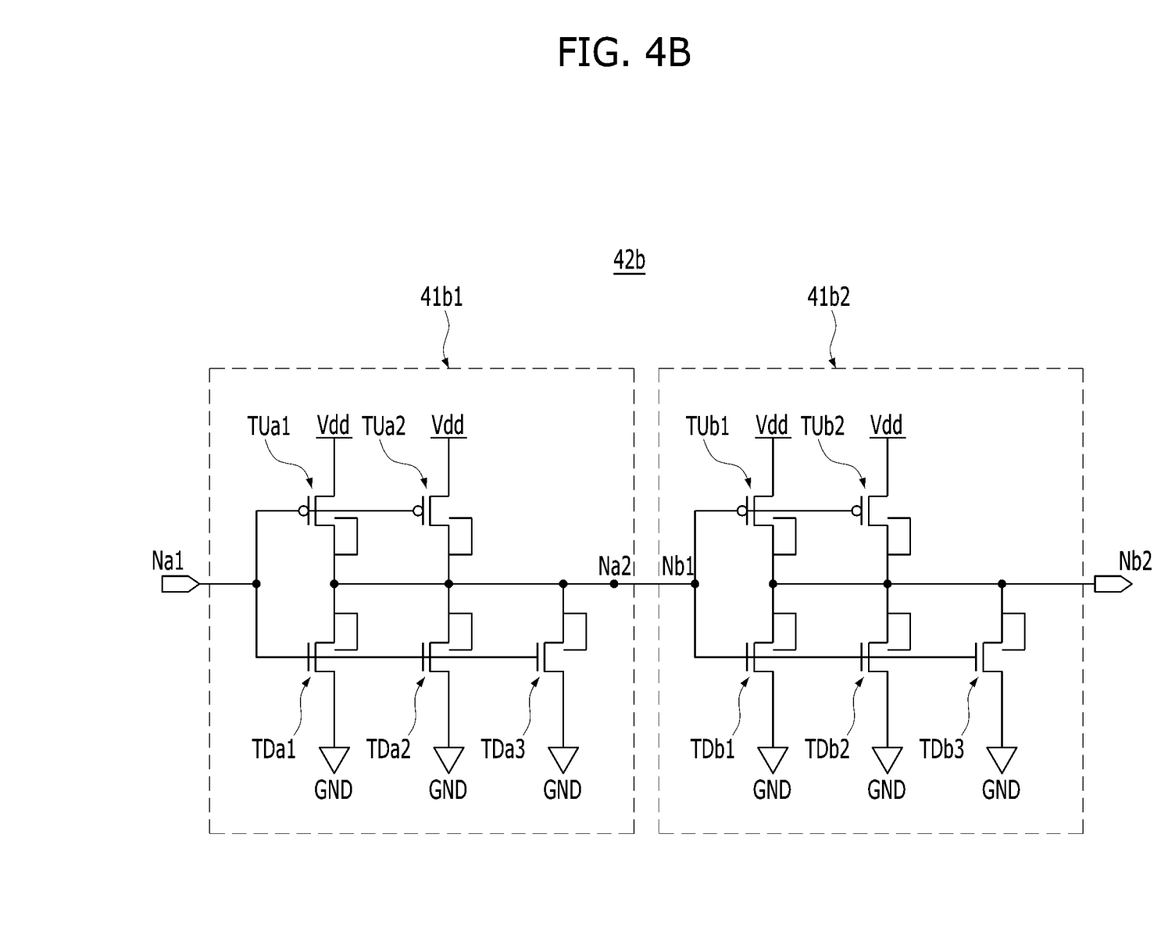

Referring to FIG. 4B, a complex transfer function circuit 42b of a synaptic array of a neuromorphic device in accordance with an embodiment of the present disclosure may include at least two unit transfer function circuits 41b1 and 41b2 electrically connected with each other in series. In other embodiments, a complex transfer function circuit includes more than two unit transfer function circuits. In an example, the unit transfer function circuits 41b1 and 41b2 may each be the same or substantially the same as the unit transfer function circuit 41b described above and with reference to FIG. 3B. Specifically, the first unit transfer function circuit 41b1 may include an inverting circuit having at least two pull-up transistors TUa1 and TUa2 connected with each other in parallel, and at least three pull-down transistors TDa1 to TDa3 connected with each other in parallel. The second unit transfer function circuit 41b2 may include an inverting circuit having at least two pull-up transistors TUb1 and TUb2 connected with each other in parallel, and at least three pull-down transistors TDb1 to TDb3 connected with each other in parallel. A first output node Na2 of the first unit transfer function circuit 41b1 and a second input node Nb1 of the second unit transfer function circuit 41b2 may be electrically connected with each other. When the complex transfer function circuit 42b includes a plurality of unit transfer function circuits 41b1 and 41b2, the output signal at the second output node Nb2 may be a smoother sigmold curve than when the complex transfer function circuit 42b includes only one unit transfer function circuit.

Figure 4C:
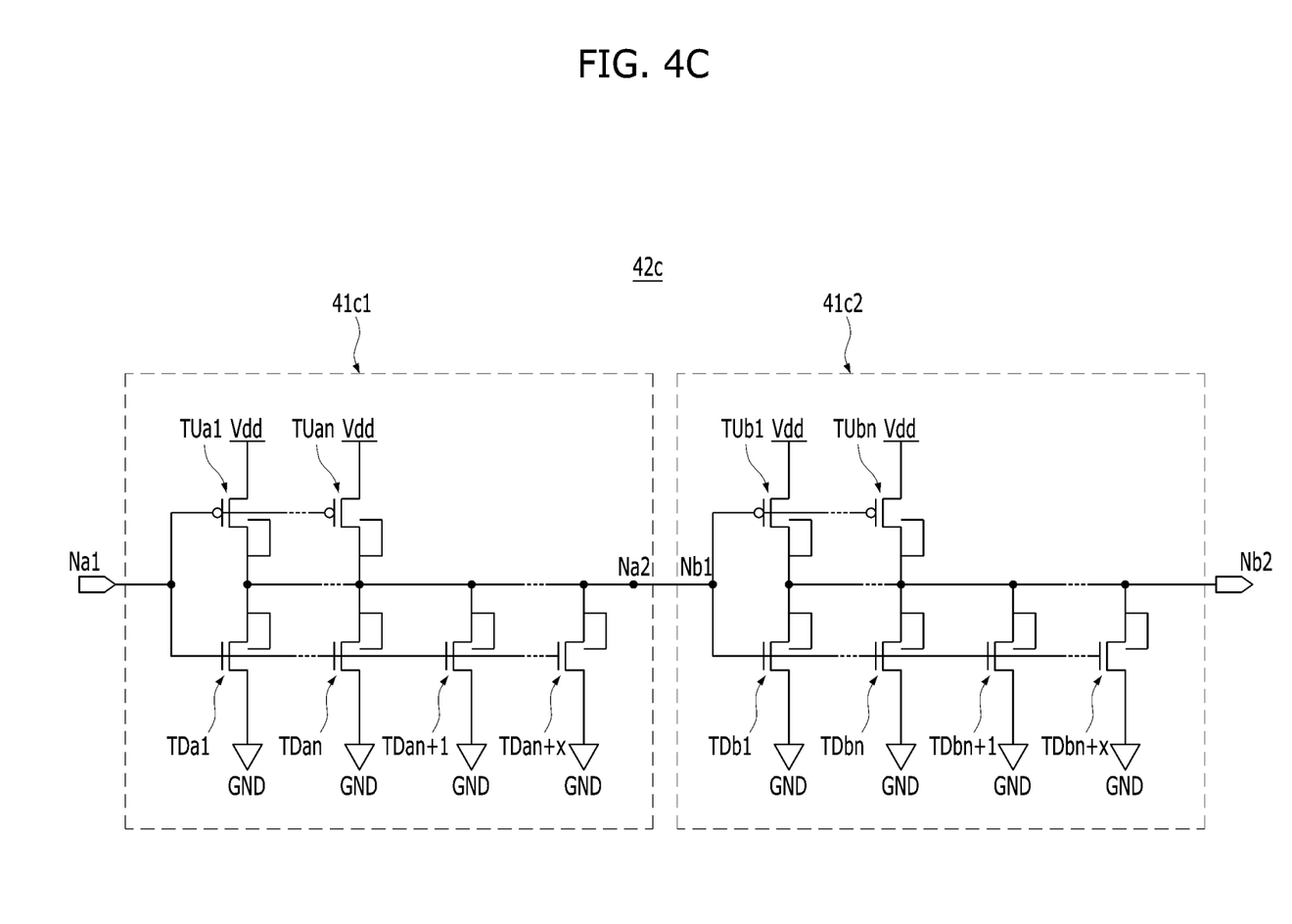

Referring to FIG. 4C, a complex transfer function circuit 42c of a synapse array of a neuromorphic device in accordance with an embodiment of the present disclosure may include at least two unit transfer function circuits 41c1 and 41c2 electrically connected with each other in series. In other embodiments, a complex transfer function circuit includes more than two unit transfer function circuits. In an example, the unit transfer function circuits 41c1 and 41c2 may each be the same or substantially the same as the unit transfer function circuit 41c shown in FIG. 3C. Specifically, the first unit transfer function circuit 41c1 may include an inverting circuit having a plurality of pull-up transistors TUa1 to TUan connected with each other in parallel and a plurality of pull-down transistors TDa1 to TDan+x connected with each other in parallel. The second unit transfer function circuit 41c2 may include an inverting circuit having a plurality of pull-up transistors TUb1 to TUbn connected with each other in parallel and a plurality of pull-down transistors TDb1 to TDbn+x connected with each other in parallel.

A first output node Na2 of the first unit transfer function circuit 41c1 and a second input node Nb1 of the second unit transfer function circuit 41c2 may be electrically connected with each other. When the complex transfer function circuit 42c includes a plurality of unit transfer function circuits 41c1 and 41c2, the output signal at the second output node Nb2 may be a smoother sigmoid curve than when the complex transfer function circuit 42c includes only one unit transfer function circuit.

The complex transfer function circuits 42a to 42c described above and with reference to FIGS. 4A to 4C, with reference to the description of the unit transfer function circuits 41a to 41c described above and with reference to FIGS. 3A to 3C, may include pull-up transistors TUx and pull-down transistors TDx having independent, different, and various threshold voltages and/or channel sizes. In embodiments of the present disclosure, the number of pull-down transistors TDx is greater than the number of pull-up transistors TUx.

Table 1 illustrates examples of channel sizes of various types of pull-up transistors TUa1 to TUb2 and pull-down transistors TDa1 to TDb3 of the transfer function circuit 42b shown in FIG. 4B.

TABLE 1

|      | (A) | (B) | (C) | (D) | (E) | (F) | (G) |
|------|-----|-----|-----|-----|-----|-----|-----|
| TUa1 | 0.4 | 0.4 | 0.4 | 0.4 | 0.4 | 0.2 | 0.8 |
| TUa2 | 0.4 | 0.4 | 0.4 | 0.4 | 0.4 | 0.2 | 0.8 |
| TDa1 | 4   | 4   | 4   | 4   | 4   | 4   | 4   |
| TDa2 | 0.4 | 1   | 5   | 0.4 | 0.4 | 0.2 | 0.8 |
| TDa3 | 0.4 | 1   | 5   | 0.4 | 0.4 | 0.2 | 0.8 |
| TUb1 | 0.4 | 0.4 | 0.4 | 0.4 | 0.4 | 0.2 | 0.8 |
| TUb2 | 2   | 2   | 2   | 10  | 0.8 | 2   | 2   |
| TDb1 | 50  | 50  | 50  | 50  | 50  | 50  | 50  |
| TDb2 | 0.4 | 0.4 | 0.4 | 0.4 | 0.4 | 0.2 | 0.8 |
| TDb3 | 0.4 | 0.4 | 0.4 | 0.4 | 0.4 | 0.2 | 0.8 |

In examples (A) through (G), the threshold voltages Vt of each transistors TUa1 to TUa2, TUb1 to TUb2, TDa1 to TDa3, and TDb1 to TDb3 are set to satisfy the following relationship.

$$Vt(TUa1)=Vt(TUb1), Vt(TUa2)=Vt(TUb2), |Vt(TUa1)|<|Vt(TUa2)|, |Vt(TUb1)|<|Vt(TUb2)|$$

$$Vt(TDa1)=Vt(TDb1), Vt(TDa2)=Vt(TDb2), Vt(TDa3)=Vt(TDb3), Vt(TDa1)<Vt(TDa2)<Vt(TDa3), Vt(TDb1)<Vt(TDb2)<Vt(TDb3)$$

Figure 5A:
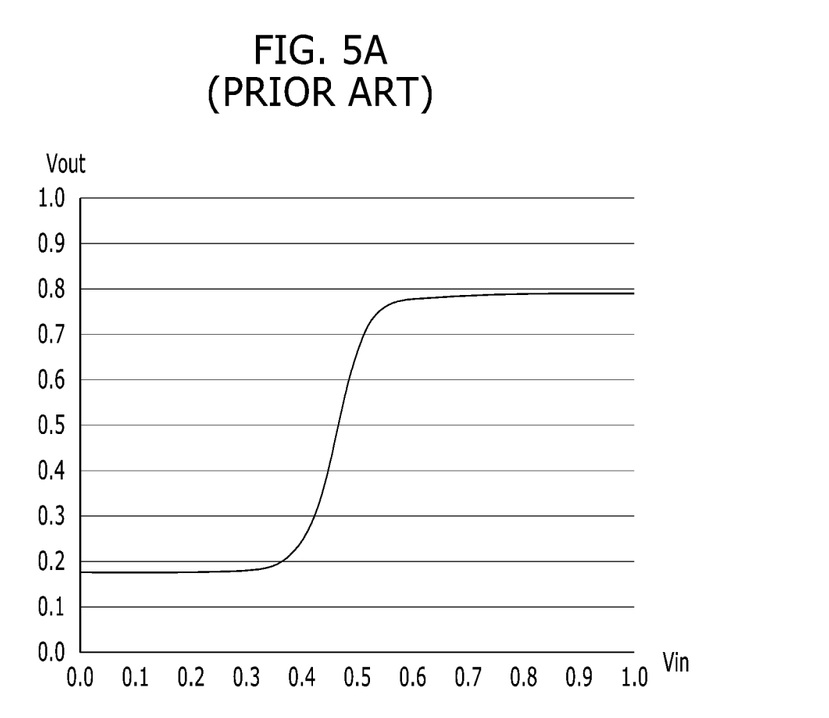
FIG. 5A illustrates a characteristic curve of an output signal of a post-synaptic neuron which does not use a transfer function circuit.
Figure 5B:
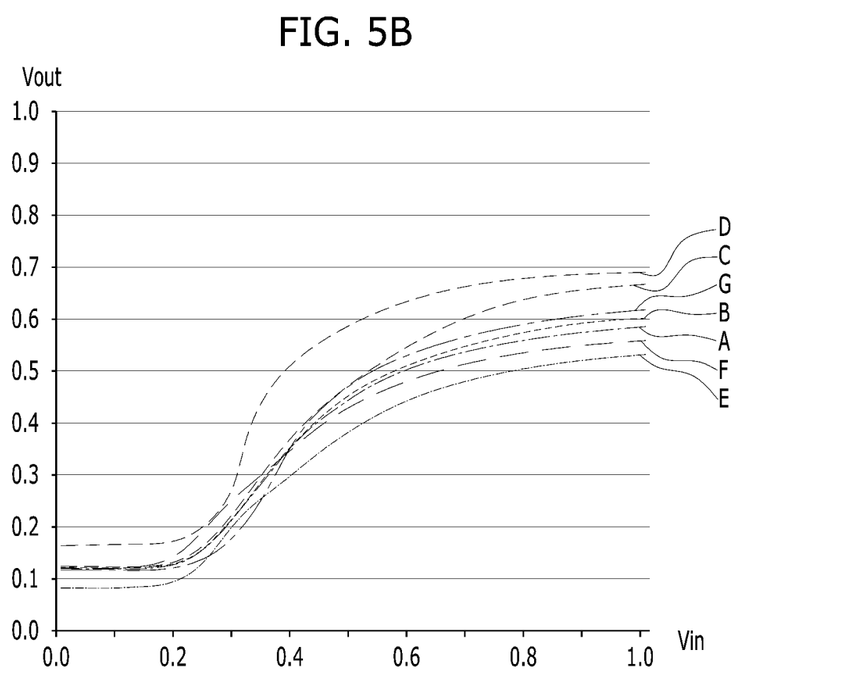
FIG. 5B illustrates characteristic curves of output signals of transfer function circuits.

FIG. 5A illustrates a characteristic curve of an output signal of a post-synaptic neuron or circuit which does not use a transfer function circuit. FIG. 5B illustrates characteristic curves of output signals of transfer function circuits of post-synaptic neurons 20 in embodiments of the present disclosure having transistors in examples (A) to (G) of Table 1. The X-axes are the input voltage Vin and the Y-axes are the output voltage Vout.

Referring to FIG. 5B, a transfer function circuit having one or more pull-up transistors TUx and two or more pull-down transistors TDx, in accordance with embodiments of the present disclosure, can smoothly change the characteristic curves of the output signals to resemble a sigmoid function curve, in contrast to the output signal of devices shown in FIG. 5A.

Figure 6A:
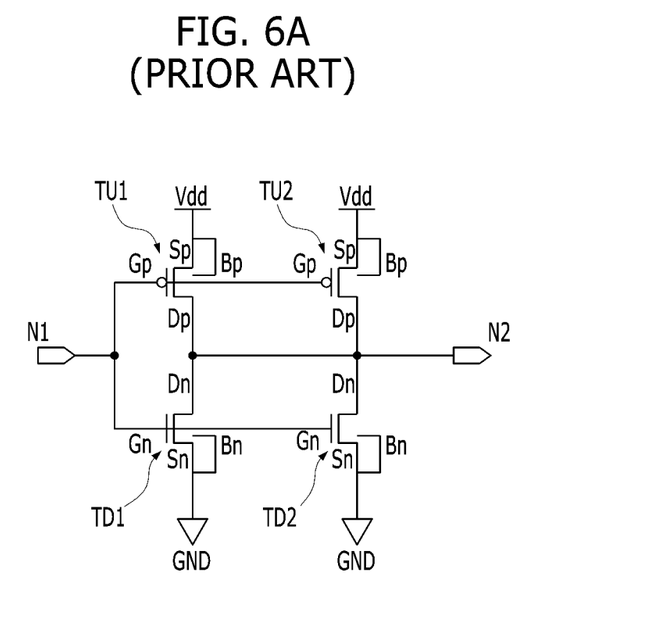
FIG. 6A is a circuit diagram illustrating an inverting circuit in accordance with the prior art.

FIG. 6A is a circuit diagram illustrating an inverting circuit in accordance with a prior art. Referring to FIG. 6A, an inverting circuit according to the prior art includes a plurality of pull-up transistors TU1, TU2 connected in parallel with each other and a plurality of pull-down transistors TD1, TD2 connected in parallel with each other. The source electrodes Sp and Sn are electrically connected with the bodies Bp and Bn, respectively.

Figure 6B:
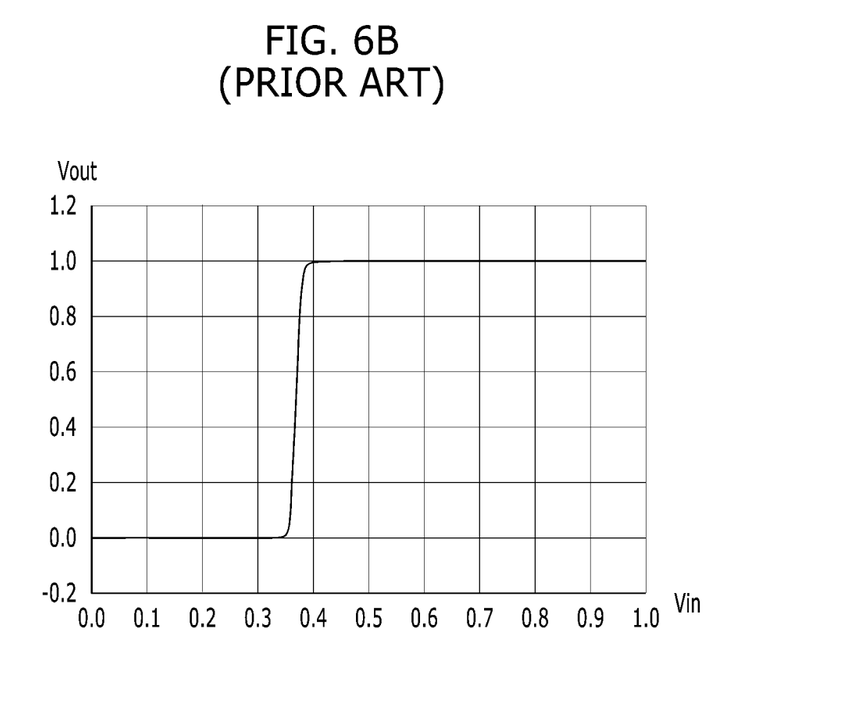
FIG. 6B illustrates a characteristic curve of an output signal of the inverting circuit shown in FIG. 6A.

FIG. 6B illustrates a characteristic curve of an output signal of the inverting circuit shown in FIG. 6A. Referring to FIG. 68B, a characteristic curve of an output signal of the inverting circuit in FIG. 6A exhibits abrupt changes.

For example, in the transistors TU1 and TU2, the source electrodes Sp and the bodies Bp are electrically connected with each other, and in transistors TD1 and TD2, the source electrodes Sn and the bodies Bn are electrically connected with each other. When voltages applied to the source electrodes Sp and Sn and the bodies Bp and Bn are smaller than a threshold voltage Vt applied to the gate electrodes Gp and Gn, channels in the transistors TU1, TU2, TD1, and TD2 are more difficult to form. Accordingly, when the source electrodes Sp and Sn and the bodies Bp and Bn are electrically connected with each other, driving characteristics of the transistors TU1, TU2, TD1, and TD2 may be abruptly changed, in contrast with a circuit in which the source electrodes Sp and Sn and bodies Bp and Bn are not electrically connected with each other. Specifically, the pull-up transistors TU1 and TU2 having the source electrodes Sp and the bodies Bp electrically connected with each other abruptly operate in a pull-up operation, and the pull-down transistors TD1 and TD2 having the source electrodes Sn and the bodies Bn electrically connected with each other abruptly operate in a pull-down operation.

In contrast, in embodiments of the disclosure, according to the present disclosure, when the drain electrodes Dp and the bodies Bp of pull-up transistors TUx are electrically connected with each other and the drain electrodes Dn and the bodies Bn of the pull-down transistors TDx are electrically connected with each other, channels can be formed at the relatively low voltages. Accordingly, when the drain electrodes Dp and Dn and the bodies Bp and Bn are electrically connected with each other, the output characteristics of the transistors TUx and TDx may exhibit gradual change. That is, the transfer function circuits 41a-41c and 42a-42c in accordance with the present disclosure exhibit smooth output curves with characteristics similar to sigmoldal curves.

Figure 7:
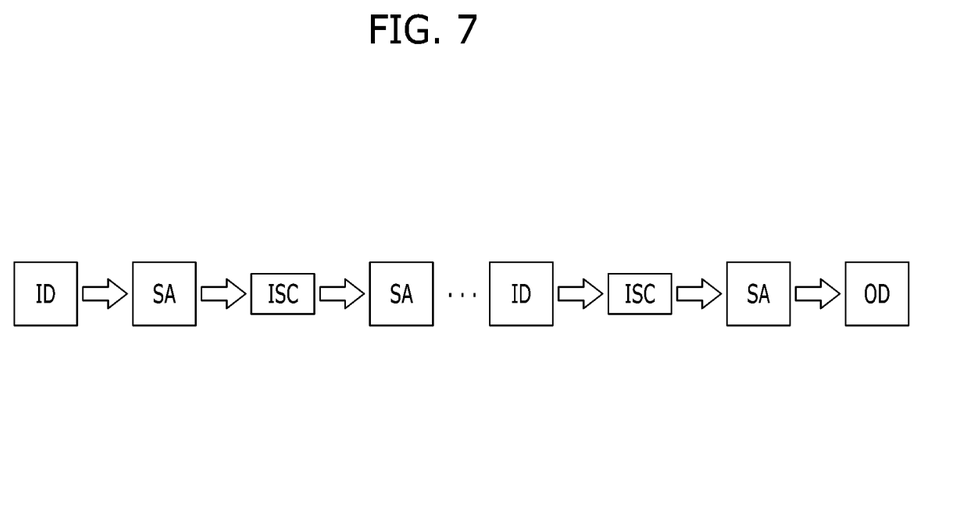
FIG. 7 is a block diagram illustrating a synaptic array system of a neuromorphic device in accordance with an embodiment of the present disclosure.

FIG. 7 is a block diagram illustrating a synaptic array system of a neuromorphic device in accordance with an embodiment of the present disclosure. Referring to FIG. 7, a synaptic array system of a neuromorphic device according to an embodiment of the present disclosure may include an input device ID, a plurality of synaptic arrays SA, inter-synaptic circuits ISC, and an output device OD. The inter-synaptic circuits ISC may be disposed between the synapse arrays SA. The inter-synaptic circuits ISC may include at least one of the transfer function circuits 41a-41c or 42a-42c in accordance with various embodiments of the present disclosure as described above and with reference to FIGS. 3A-3C and 4A-4C.

Figure 8:
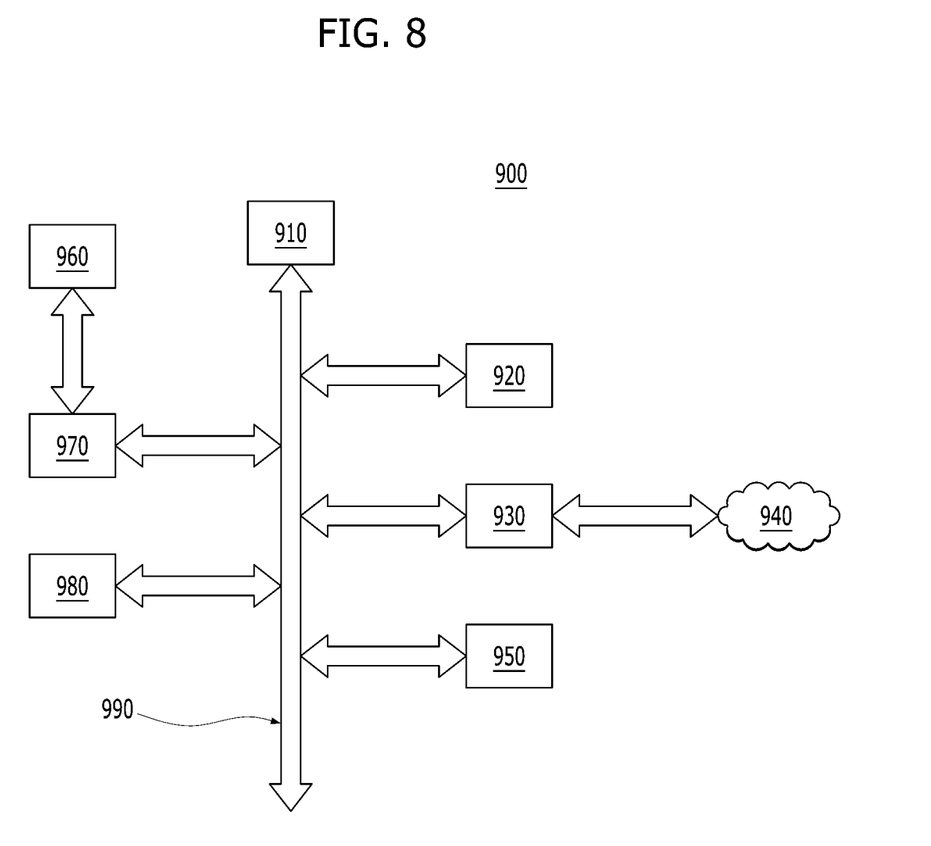
FIG. 8 is a diagram schematically illustrating a pattern recognition system in accordance with an embodiment of the present disclosure.

FIG. 8 is a diagram schematically illustrating a pattern recognition system 900 in accordance with an embodiment of the present disclosure. For example, the pattern recognition system 900 may include any of a speech recognition system, an imaging recognition system, a code recognition system, a signal recognition system, and one or more systems for recognizing various patterns.

Referring to FIG. 8, the pattern recognition system 900 may include a Central Processing Unit (CPU) 910, a memory unit 920, a communication control unit 930, a network 940, an output unit 950, an input unit 960, an Analog-Digital Converter (ADC) 970, a neuromorphic unit 980, and/or a bus 990. The CPU 910 may generate and transmit various signals for a learning process of the neuromorphic unit 980, and perform various processes and functions for recognizing patterns according to an output from the neuromorphic unit 980. For example, the CPU 910 may perform processes and functions for recognizing speech and imaging patterns based on an output from the neuromorphic unit 980.

The CPU 910 may be connected with the memory unit 920, the communication control unit 930, the output unit 950, the ADC 970, and the neuromorphic unit 980 through the bus 990.

The memory unit 920 may store various pieces of information, which may be stored in the pattern recognition system 900. The memory unit 920 may include one or more of a volatile memory device, such as a DRAM or an SRAM device; a nonvolatile memory, such as PRAM, MRAM, ReRAM or NAND flash memory; and various memory units, such as a Hard Disk Drive (HDD) and a Solid State Drive (SSD).

The communication control unit 930 may transmit and/or receive data to and/or from a communication control unit of another system through the network 940. For example, the communication control unit 930 may transmit speech and/or image recognition data through the network 940.

The output unit 950 may output data in various manners. For example, the output unit 950 may include a speaker, a printer, a monitor, a display panel, a beam projector, a hologrammer, and/or other various output devices. The output unit 950 may output, for example, speech and/or image recognition data.

The input unit 960 may include a microphone, a camera, a scanner, a touch pad, a keyboard, a mouse, a mouse pen, and/or one or more of various sensors.

The ADC 970 may convert analog data inputted from the input unit 960 into digital data.

The neuromorphic unit 980 may perform learning or recognition using the data outputted from the ADC 970, and output data corresponding to recognized patterns. The neuromorphic unit 980 may include one or more of the neuromorphic devices in accordance with the various embodiments described above.

According to the present disclosure, a neuromorphic device may include synapse arrays that exhibit smooth changes to an output curve, such as a sigmoidal curve. Thus, synaptic signals can have multiple levels.

Although various embodiments have been described for illustrative purposes, it will be apparent to those skilled in the art that various changes and modifications may be made without departing from the spirit and scope of the disclosure, as defined in the following claims.

What is claimed is:

1. A neuromorphic device comprising:
   a pre-synaptic neuron;
   a synapse electrically connected with the pre-synaptic neuron through a row line; and
   a post-synaptic neuron electrically connected with the synapse through a column line,
   wherein the post-synaptic neuron comprises a post-neuron circuit and a post-neuron transfer function circuit electrically connected to the column line, and
   wherein the post-neuron transfer function circuit comprises a first inverting circuit including at least one first pull-up transistor and at least two first pull-down transistors, the pull-down transistors being electrically connected with each other in parallel.

2. The neuromorphic device of claim 1, wherein a number of the first pull-down transistors is greater than a number of the first pull-up transistors.

3. The neuromorphic device of claim 1,
   wherein the first pull-up transistor comprises a PMOS transistor including:
   a source electrode electrically connected to a power supply voltage node;
   a drain electrode electrically connected to an output node of the first inverting circuit;
   a gate electrode electrically connected to an input node of the first inverting circuit; and
   a body electrically connected to the drain electrode.

4. The neuromorphic device of claim 1,
   wherein each of the first pull-down transistors comprises an NMOS transistor including
   a source electrode electrically connected with a ground voltage node;
   a drain electrode electrically connected with an output node of the first inverting circuit;
   a gate electrode electrically connected with an input node of the first inverting circuit; and
   a body electrically connected with the drain electrode.

5. The neuromorphic device of claim 1, wherein the post-neuron transfer function circuit further comprises a second inverting circuit having an input node electrically connected with an output node of the first inverting circuit.

6. The neuromorphic device of claim 5, wherein the second inverting circuit comprises at least one second pull-up transistor and at least two second pull-down transistors, and wherein the pull-down transistors are electrically connected in parallel with each other.

7. The neuromorphic device of claim 1, wherein the first inverting circuit comprises at least two first pull-up transistors including PMOS transistors, and wherein at least two of the first pull-up transistors have different threshold voltages.

8. The neuromorphic device of claim 1, wherein the first inverting circuit comprises at least two first pull-up transistors including PMOS transistors, and wherein at least two of the first pull-up transistors have different channel sizes.

9. The neuromorphic device of claim 1, wherein the first pull-down transistors comprise NMOS transistors, and wherein at least two of the first pull-down transistors have different threshold voltages.

10. The neuromorphic device of claim 1, wherein the first pull-down transistors comprise NMOS transistors, and wherein at least two of the first pull-down transistors have different channel sizes.

11. A neuromorphic device comprising:
    a pre-synaptic neuron;
    a synapse electrically connected with the pre-synaptic neuron through a row line; and
    a post-synaptic neuron electrically connected with the synapse through a column line,
    wherein the post-synaptic neuron comprises a post-neuron transfer function circuit,
    wherein the post-neuron transfer function circuit comprises a first inverting circuit and a second inverting circuit electrically connected in series with each other,
    wherein the first inverting circuit comprises a plurality of first pull-up transistors and a plurality of first pull-down transistors, wherein the second inverting circuit comprises a plurality of second pull-up transistors and a plurality of second pull-down transistors, and wherein each of the plurality of first pull-up transistors includes a drain electrode and a body electrically connected with each other, each of the plurality of second pull-up transistors includes a drain electrode and a body electrically connected with each other, each of the plurality of first pull-down transistors includes a drain electrode and a body electrically connected with each other, and each of the plurality of second pull-down transistors includes a drain electrode and a body electrically connected with each other.

12. The neuromorphic device of claim 11, wherein a number of the first pull-down transistors is greater than a number of the first pull-up transistors, and wherein a number of the second pull-down transistors is greater than a number of the second pull-up transistors.

13. The neuromorphic device of claim 11, wherein the plurality of first pull-up transistors and the plurality of second pull-up transistors comprise PMOS transistors, and wherein at least two of the first pull-up transistors and the second pull-up transistors have different threshold voltages.

14. The neuromorphic device of claim 11, wherein the plurality of first pull-down transistors and the plurality of second pull-down transistors comprise NMOS transistors, and wherein at least two of the first pull-down transistors and the second pull-down transistors have different threshold voltages.

15. The neuromorphic device of claim 11, wherein the plurality of first pull-up transistors and the plurality of second pull-up transistors comprise PMOS transistors, and wherein at least two of the first pull-up transistors and the second pull-up transistors have different channel sizes.

16. The neuromorphic device of claim 11, wherein the plurality of first pull-down transistors and the plurality of second pull-down transistors comprise NMOS transistors, and wherein at least two of the first pull-down transistors and the second pull-down transistors have different channel sizes.

17. A neuromorphic device comprising:

a pre-synaptic neuron;

a synapse electrically connected with the pre-synaptic neuron through a row line; and a post-synaptic neuron electrically connected with the synapse through a column line, wherein the post-synaptic neuron comprises a post-neuron transfer function circuit, wherein the post-neuron transfer function circuit comprises an inverting circuit, wherein the inverting circuit comprises a plurality of pull-up transistors and a plurality of pull-down transistors, wherein the plurality of pull-down transistors each comprise at least two channel sizes, wherein the plurality of pull-up transistors each have drain electrodes and bodies electrically connected with each other, and wherein the plurality of pull-down transistors each have drain electrodes and bodies electrically connected with each other.

18. The neuromorphic device of claim 17, wherein the plurality of pull-up transistors comprise PMOS transistors, and wherein the plurality of pull-up transistors comprise at least two channel sizes.

19. The neuromorphic device of claim 17, wherein the plurality of pull-up transistors comprise PMOS transistors, and wherein the plurality of pull-up transistors comprise at least two threshold voltages.

20. The neuromorphic device of claim 17, wherein the plurality of pull-down transistors comprise NMOS transistors, and wherein the plurality of pull-down transistors comprise at least two threshold voltages.

* * * * *